United States Patent
Wang et al.

(10) Patent No.: US 7,852,824 B2
(45) Date of Patent: Dec. 14, 2010

(54) PERFORMANCE IN MOBILE COMMUNICATIONS SYSTEMS

(75) Inventors: Xiaohui Wang, Lund (SE); Erik Dahlbäck, Veberöd (SE); Marten Myrehed, Lund (SE); Torgny Palenius, Barsebäck (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 663 days.

(21) Appl. No.: 11/913,118

(22) PCT Filed: Apr. 20, 2006

(86) PCT No.: PCT/EP2006/003612

§ 371 (c)(1),
(2), (4) Date: Oct. 30, 2007

(87) PCT Pub. No.: WO2006/117078

PCT Pub. Date: Nov. 9, 2006

(65) Prior Publication Data

US 2008/0200177 A1   Aug. 21, 2008

Related U.S. Application Data

(60) Provisional application No. 60/677,953, filed on May 5, 2005.

(30) Foreign Application Priority Data

May 3, 2005   (EP) .................................. 05388038

(51) Int. Cl.
H04B 7/212 (2006.01)

(52) U.S. Cl. .................................................. 370/348
(58) Field of Classification Search ................ None
See application file for complete search history.

(56) References Cited

U.S. PATENT DOCUMENTS

| | | | |
|---|---|---|---|
| 6,480,525 B1* | 11/2002 | Parsa et al. .................. | 370/342 |
| 6,985,474 B2* | 1/2006 | Dahlman et al. ............. | 370/347 |
| 7,013,146 B2* | 3/2006 | Wang et al. .................. | 370/342 |
| 2003/0148737 A1* | 8/2003 | Miyazaki et al. ........... | 455/67.1 |

(Continued)

OTHER PUBLICATIONS

Vanghi V et al: "Performance of wcdma downlink access and paging indicators in multipath rayleigh fading channels" Personal, Indoor and Mobile Radio Communications, 2003. PIMRC 2003. 14th IEEE Proceedings on Sep. 7-10, 2003, Piscataway, NJ, USA,IEEE, vol. 1, Sep. 7, 2003, pp. 331-335, XP010681612 ISBN: 0-78037822-9.

*Primary Examiner*—Anh-Vu Ly

(57) ABSTRACT

In third generation mobile communications networks, e.g. CDMA systems, a mobile station intending to access a base station transmits a request for access to a base station and waits for a response in the form of an indicator signal. Both detecting a signal as an acknowledgement message without one being sent from the base station and failing to detect such an acknowledgement message can give rise to noise and interference in the whole cell. The invention provides a method and a user equipment for determining the received signal strength in an access slot in a downlink channel and for asserting whether detection of an indicator signal from the base station in the access slot in the downlink channel is reliable. Hereby, a more secure reception of indicator signals can be obtained, which leads to reduced interference and noise in the whole cell.

17 Claims, 5 Drawing Sheets

U.S. PATENT DOCUMENTS

| | | | |
|---|---|---|---|
| 2004/0184421 A1* | 9/2004 | Hondo | 370/329 |
| 2004/0229572 A1* | 11/2004 | Cai et al. | 455/69 |
| 2005/0026622 A1* | 2/2005 | Georgeaux et al. | 455/450 |
| 2005/0030919 A1* | 2/2005 | Lucidarme et al. | 370/328 |
| 2005/0232158 A1* | 10/2005 | Hondo | 370/241 |
| 2006/0140255 A1* | 6/2006 | Jonsson | 375/148 |
| 2007/0142070 A1* | 6/2007 | Soldani et al. | 455/515 |

* cited by examiner

PERFORMANCE IN MOBILE COMMUNICATIONS SYSTEMS

This application claims the benefit of U.S. Provisional Application No. 60/677,953, filed May 5, 2005, the disclosure of which is fully incorporated herein by reference.

TECHNICAL FIELD OF THE INVENTION

This invention relates to a method of improving the performance of a random access mobile communications system, comprising the following steps to be performed in a user equipment in the communications system: transmitting a random access request on an uplink channel, and receiving an indicator signal from a base station on a downlink channel, which indicator signal has been generated in and transmitted from the base station upon the detection in the base station of said random access request. The invention moreover relates to a user equipment and to a computer program product.

DESCRIPTION OF RELATED ART

Modern wireless communications networks employ different access techniques when a first network component, e.g. a user equipment, such as a mobile station, intends to access a second network component, e.g. a base station. As an example for such access techniques the so-called random access (RA) scheme can be mentioned. The term "random access" is meant to indicate, that access requests are generated in a random manner from the point of view of a network component receiving the access request.

An example of a RA scheme is specified by the $3^{rd}$ generation Partnership Project (3GPP) in section 6 of the 3GPP document TS 25.214, version 5.9.0 (2004-06) titled "Technical Specification Group Radio Access Network; Physical layer procedure (FDD) (Release 5)". Another example of an RA scheme has been defined by standardization bodies for the Global System of Mobile Communication (GSM).

In CDMA systems, a user equipment, for example a mobile station such as a mobile phone, intending to access a base station, will transmit a random access request, typically comprising a preamble. The random access request is transmitted by the user equipment at an initial power level in an access slot; thereafter the user equipment waits for a response in the form of an indicator signal sent on a downlink channel from the base station in a number of subsequent access slots, typically three or four. If no indicator signal is received, the user equipment ramps up and transmits another random access request at a higher power level until it receives an indicator signal from the base station indicating that access is acknowledged.

In the receiver part of the user equipment, the indicator signal is picked up and the received signal strength on the downlink channel is calculated and compared with thresholds associated with False Alarm Rates (FAR), i.e. the probabilities of detecting an indicator as an acknowledgement message even if no such acknowledgement message has been sent from the base station. Such FARs are caused by strong noises and interferences occurring in the places of detected indicator signals. In an access slot, the noises and interferences are typically small, but large noises and interferences can disturb the detection of indicator signals on the downlink channel from time to time.

If the noise distribution functions are Gaussian, the thresholds of such false detections can be calculated as a function of the FAR, so that if the received signal strength on the downlink channel is larger than a predefined threshold, it is interpreted as an indicator signal comprising an "acknowledgement message" (ACK); if it is smaller than the negative value of the threshold, it is interpreted as an indicator signal comprising a "no acknowledgement message" (NACK); and if the absolute value of the received signal strength is smaller than the absolute value of the predefined threshold, it will be interpreted as "no indicator signal" or "no message" (NOM). However, even if the absolute value of the received signal strength is found to be smaller than the predefined threshold, it is not precluded that an indicator signal was sent from a base station, but distorted by noises and/or interferences. The probability of missing an indicator signal is called Missed Detection Rates (MDR).

It is a problem that it is very difficult to achieve low FAR and low MDR simultaneously. Current indicator signal detections have noticeable FARs and the reliability and efficiency of uplink channels can be degraded noticeably by the false detections of the random access requests. If e.g. a user equipment would interpret noise and/or interferences as an indicator signal from a base station and then send several frames of data, e.g. to another user equipment, the data would be lost and it would further cause high interferences in the whole cell. On the other hand, if an indicator signal is missed by the user equipment, the user equipment would have to restart the random access process. This leads to a delay in time and reduced performance of the mobile communications system in that retransmissions of random access requests cause increased interference in the cell.

Therefore, a need exists to improve the performance of a random access mobile communication system, especially with regard to detecting indicator signals transmitted to user equipment from a base station.

SUMMARY OF THE INVENTION

In accordance with the above, it is an aspect of this invention to provide a method, a user equipment and a computer program product for improving the performance of a random access mobile communication system. This and other aspects are obtained, when the method of the kind mentioned in the opening paragraph further comprises the following steps: (a) determining the received signal strength in an access slot in said downlink channel; and (b) asserting whether detection of an indicator signal from the base station in said access slot in said downlink channel is reliable based on the determination in step (a). Hereby, the influence of noise and/or interferences can be reduced. This is due to the fact that mistakes that could cause delays and waste of resources, such as sending messages, when no indicator signal has been sent from a base station to the user equipment, can be avoided. If it is determined that an access slot is not reliable, another later access slot can be used.

It should be noted that an indicator signal from a base station typically comprises an acquisition response in a form that can be interpreted as an "acknowledge message", a "no acknowledge message" or "no message". It should moreover be noted that the term "uplink channel" is meant to cover any channel from a user equipment to a base station and the term "downlink channel" is meant to cover any channel from a base station to a user equipment.

In an embodiment of the method of the invention, said indicator signal is associated with a first signature selected from a set of unique signatures. Such a first signature selected from a set of unique signatures reduces the risk of collisions between random access requests from user equipment to a base station and indicator signals from a base station to a user equipment. Typically, the random access request from the user equipment is associated with a first signature selected from a set of unique signatures, and the indicator signal transmitted from the base station upon reception of the random access request is associated with the same first signature. Even though the selection of the first signature typically is performed randomly and a risk of collisions between indicator signals from a base station to a user equipment still exists, the use thereof improves the efficiency considerably. In the 3GPP W-CDMA system, there are 16 signatures, each of them having 32 bits, forming 16 symbols, as described by Table 22 in 3GPP TS 25.211.5.3.3.7. The signatures are orthogonal with each other.

In yet an embodiment of the method of the invention, said indicator signal is an Acquisition Indicator. In this instance, the Acquisition Indicator is typically transmitted via an Acquisition Indicator CHannel (AICH) that is a physical channel in a W-CDMA system.

In another embodiment, step (a) of the method according to the invention comprises determining the received signal strength in said downlink channel on at least one second signature in the set of unique signatures, which at least one second signature is different from said first signature. Since the first signature associated with the indicator signal is known, the user equipment knows that this first signature should be used to decode the indicator signal from the base station. The received signal strength of this signature can be determined, but since the indicator signal is not known beforehand, it cannot be determined on the basis of the received signal strength if this received signal strength is due to an indicator signal transmitted from the base station or to noise and/or interferences. However, a good judgement of the overall noises and/or interferences can be obtained from the determination of noise and/or interferences in the downlink channel of a signature which is known not to be used in a transmission of an indicator signal. If it is determined that the received signal strength in the downlink channel of a second signature not used to transmit an indicator signal is high, e.g. larger than a predetermined threshold, this is a strong indication that the noises and/or interferences are large and that the corresponding access slot can not be used for reception of indicator signals. In W-CDMA systems, 16 signatures are available, whereof e.g. 10 signatures may be used for Random Access CHannel (RACH) and 6 signatures may be used for the Common Packet CHannel (CPCH).

In yet another embodiment of the method according to the invention, said at least one second signature is a reserved signature allocated to the determination of the received signal strength. The reserved signature can be used to determine the overall level of noises and/or interferences on the downlink channel and using a reserved signature provides a simplification. However, the use of a reserved signature should typically be set in the technical specification of the communications system.

In yet another embodiment of the method according to the invention, said determination of the received signal strength on said at least one second signature is performed in the same access slot as the determination of the received signal strength on said first signature. Hereby, the determination of the received signal strength on said at least second signature will not introduce any appreciable time delay.

In yet a further embodiment, step (a) of the method comprises determining the received signal strength in said downlink channel of at least one randomly chosen signature in the set of unique signatures. Normally, the level of noises and/or interferences is negligible. Moreover, a large portion of the signatures are not used. Thus, if the power level(s) for all of the at least one randomly chosen signatures is/are high, it can be assumed that the noise level is too high to obtain a reliable signal in the corresponding access slot.

Preferably, the method according to embodiments of the invention further comprises the step of: (c1) if step (b) indicates that detection of an indicator signal from the base station in said access slot is not reliable, repeating the steps (a) and (b) for a later access slot. Thus, the user equipment can continue the RACH procedure and get the next access slot later, e.g. a couple of access slots later. Hereby, the influence of the noise and/or interferences in the access slot, that was determined not to be reliable, can be avoided. The later access slot can be the next access slot or one some time later.

In an alternative embodiment of the method according to the invention, the method further comprises the step of: (c2) if step (b) indicates that detection of an indicator signal from the basis station in said access slot is not reliable, receiving the indicator signal in an extra access slot. This extra access slot should always be sent directly after the regular access slot from the base station. However, it only needs to be treated by the user equipment when the regular access slot is not reliable. Hereby, the extra access slot ensures a very reliable reception of the indicator signal. This is advantageous, especially when many user equipments attempt to use high data rates in the uplink. Of course, the extra access slot has to be supported by the technical specification of the communications system.

In another alternative embodiment of the method according to the invention, the method further comprises the step of: (c3) if step (b) indicates that detection of an indicator signal (IS) in said access slot is not reliable, retransmitting said random access request (RAR) to said base station (BS) on said uplink channel (350). Hereby, the base station (BS) is prompted to transmit (another) indicator signal arranged to be received by the user equipment.

In yet another alternative embodiment, the method according to embodiments of the invention further comprises the step of: (d) if step (b) indicates that detection of an indicator signal from the base station in said access slot is reliable, interpreting said indicator signal from said base station. Thus, if it is asserted, that the detection of an indicator signal from the base station is reliable, the indicator signal can be received and interpreted by the user equipment with a certainty that the indicator signal has been received correctly and has not been disturbed by noise and/or interferences.

In the method according to another embodiment of the invention, the interpreting of said indicator signal (IS) comprises comparing the received signal strength on the downlink channel with at least one predetermined threshold. This at least one predetermined threshold could be determined in relation to False Alarm Rates (FAR).

In the method according to embodiments of the invention the indicator signal is interpreted as an "acknowledgement message" (ACK), a "no acknowledgement message" (NACK) or no message (NOM). Thus, when the reception of an indicator signal from the base station is indicated as reliable, the content of the indicator signal can be interpreted with high reliability.

The invention moreover relates to a user equipment and to a computer program product having advantages corresponding to the advantages described above in relation to the method.

BRIEF DESCRIPTION OF THE DRAWINGS

The invention will be explained more fully below in connection with alternative embodiments and with reference to the drawing, in which.

DETAILED DESCRIPTION OF EMBODIMENTS

The following description is given in relation to W-CDMA systems and the channels used therein as specified by the 3$^{rd}$ Generation Partnership Project, e.g. in the 3GPP document TS 25.214, version 5.9.0 (2004-06) and in the 3GPP document TS 25.211, version 5.6.0 (2004-09). However, it should be understood, that this is an example only and that the invention also could be employed in other systems.

Figure 1:
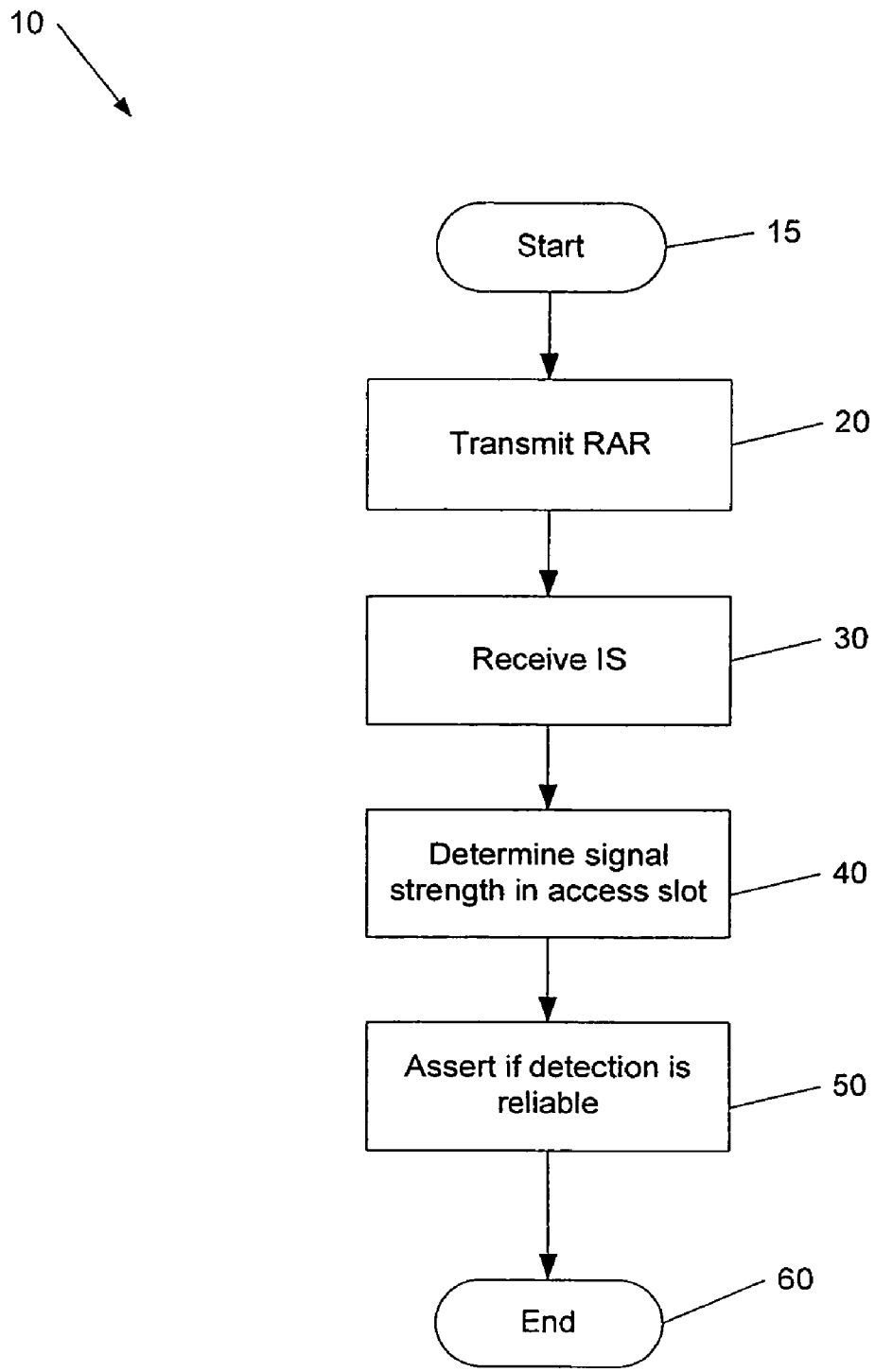
FIGS. 1 to 3 show flowcharts of different embodiments of the method according to the invention.
Figure 2:
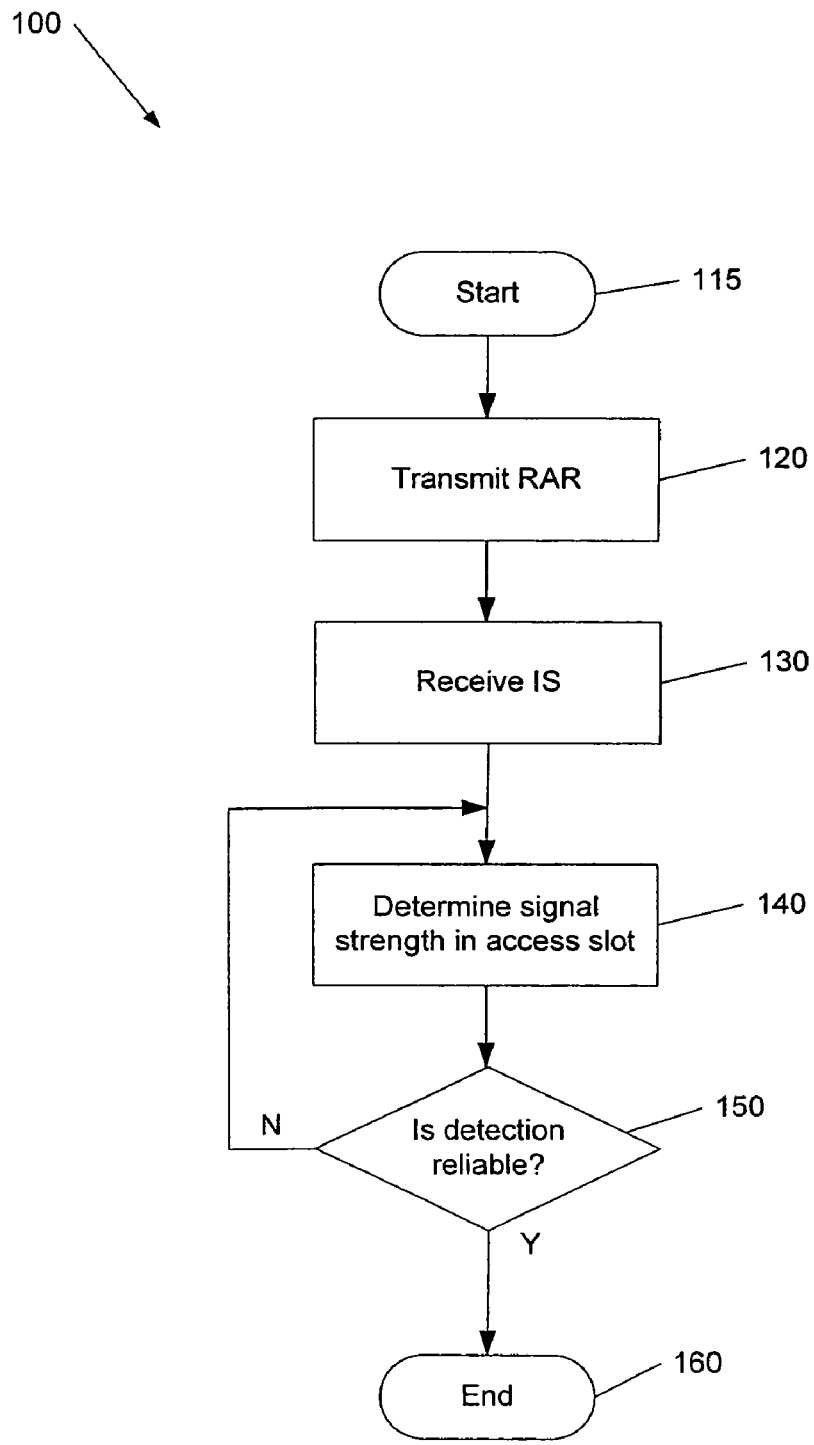
Figure 3:
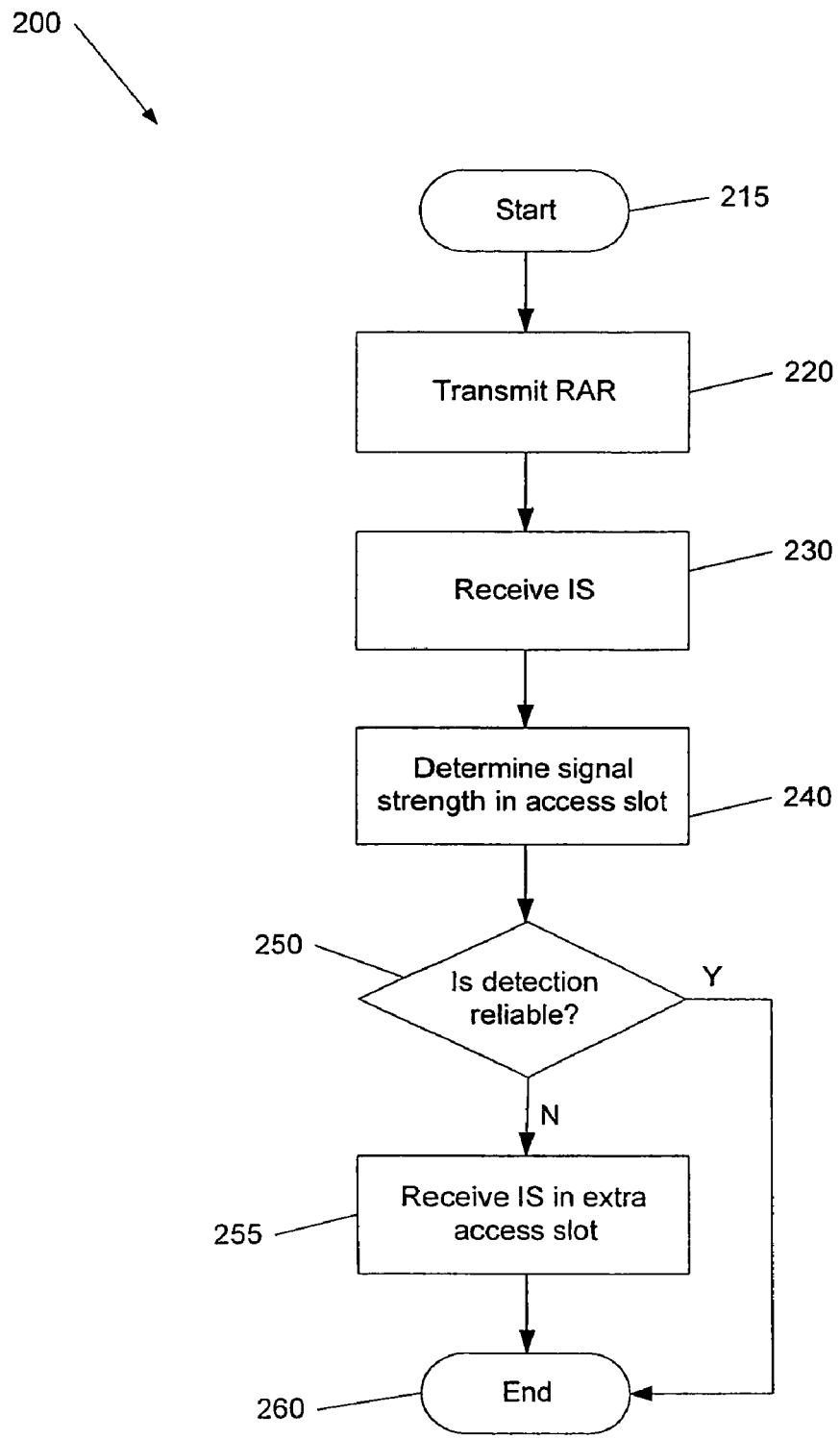

FIGS. 1 to 3 show flowcharts of different embodiments of the method according to the invention. The alternative embodiments of the methods shown in FIGS. 1 to 3 are carried out in a user equipment.

FIG. 1 illustrates a method 10 of improving the performance of a random access mobile communications system by asserting whether detection in a user equipment of an indicator signal from a base station can be trusted. The method 10 starts in step 15 and continues to step 20, wherein the user equipment transmits a random access request (RAR), which comprises a preamble. In a W-CDMA system, this random access request is transmitted via the uplink channel Physical Random Access CHannel (PRACH). The random access request is associated with a first signature selected from a set of unique signatures. The first signature is typically randomly selected from the set of unique signatures, but the same signature is used by the user equipment to transmit the random access request and by the base station to transmit the indicator signal (IS). In a W-CDMA system the indicator signal is an Acquisition Indicator (AI). The signature allows a base station to discriminate between random access request transmitted from different user equipments. Each such signature is a sequence of 16 complex numbers.

The method continues to step 30, wherein an indicator signal (IS) is received from the base station. This IS has been generated in the base station upon the base station detecting the random access request and has been transmitted to the user equipment on a downlink channel. In the case of W-CDMA system the indicator signal (IS) will be an Acquisition Indicator (AI) and will be transmitted via the downlink channel AICH. The AI can be an "acknowledgement message" ACK, a "no acknowledgement message" NACK or "no message" NOM. The AI is carried by an access slot, which is a sequence of 16 symbols, which spans over 2 radio slots. These symbols have the spreading factor of 256. The 16 AICH symbols can subsequently be used by the user equipment to determine the AI.

The method continues to step 40, wherein the user equipment determines the received signal strength in an access slot that could include an AI from the base station. This step can be carried out by determining the received signal strength in said downlink channel on at least one second signature in the set of unique signatures, which at least one second signature is different from said first signature. This determination of the received signal strength on the at least one second signature could be performed in the same access slot as the determination of the received signal strength on the first signature. In this case, the at least one second signature could be any other than the first signature out of the 16 signatures in the access slot in question. The determination of the received signal strength is well known and will be described shortly in the following.

In a receiver part of the user equipment, the 16 AICH symbols are picked up by multiplying the de-spreaded symbols with the complex conjugates of the corresponding sequence of the complex numbers of the signature in question, and accumulated to obtain the received signal strength on the downlink channel, the so-called received AICH Signal Strength (AISS). This AISS can subsequently be compared with threshold determined by the False Alarm Rates (FAR). In this embodiment a RAKE receiver in the user equipment is used to de-spread received AICH and CPICH symbols. Thereafter, the CPICH symbols are employed to compute the Signal Interference Ratio (SIR) or the Interference Signal Ratio (ISR), which are to be used for the calculations of the AISS and thresholds associated with FAR (FAR-thresholds) and to perform channel estimates. The calculations of SIR and ISR are well known and will not be described further. A combiner associated with or part of the RAKE-receiver applies the channel estimates to correct any phase distortion of the AICH symbols and subsequently sums over all paths that carry the signals over the air. The symbols in the combiner are then used to calculate the AISS as follows:

$$AISS = \frac{SIR_{max}}{SIR_1} * \text{Re}\left(\sum_{j=1}^{10} x_j * a^*_{s,j}\right) + \frac{SIR_{max}}{SIR_2} * \text{Re}\left(\sum_{j=11}^{16} x_j * a^*_{s,j}\right). \quad (1)$$

where $SIR_1$ and $SIR_2$, respectively, denote the SIR value for the first slot and the second slot, respectively, and $SIR_{max}$ is the largest of the values $SIR_1$ and $SIR_2$. The terms $\{x_j\}$ are the AICH symbols out of the combiner and the terms $\{a^*_{s,j}\}$ are the complex conjugates of the sequence of the designated signature. In equation (1), the first summation is thus a summation over the first 10 symbols and the second summation is a summation over the last 6 symbols, corresponding to a summation over the first slot and a summation over the first part of the second slot. It should be noted, that the terms "first slot" and "second slot", respectively, denote the first and second radio slot that make up the access slot. The access slot, spanning over two radio slots (i.e. 16 symbols), carries the AI.

The threshold for a given FAR can be calculated as:

$$\Gamma_{FAR} = \gamma_{FAR} * SIR_{max} * \sqrt{2 * ISR_{filter}} \quad (2)$$

where $\gamma_{FAR}$ is a dimensionless threshold, which is normalized by the variance where the probability of the Gaussian variables beyond this dimensionless threshold is equal to a predefined FAR. $ISR_{filter}$ is the filtered ISR-value. Finally, the AI of the sequence of the signature is determined as an ACK, NACK or NOM message, respectively, depending on whether AISS is larger than $\Gamma_{FAR}$, smaller than $-\Gamma_{FAR}$ or lies between $-\Gamma_{FAR}$ and $\Gamma_{FAR}$, respectively. However, this interpretation of the AI by comparing the AISS with the $\Gamma_{FAR}$ occurs after step 50 of the method 10.

After step 40 of the method 10 the flow continues to step 50, wherein it is asserted, if the detection of an AI in the access slot is reliable. The user equipment has the knowledge of which signature to apply to decode an AI, when this is received in the user equipment, since the AI is carried by the AICH using one out of a set of 16 unique signatures and since this signature was used by the user equipment to send the RACH preamble via the PRACH channel. From the AISS of this signature, the received signal strength was determined in step 40. However, since the AI is not known beforehand, it cannot be determined on the basis of the received signal strength if this received signal strength is due to an AI transmitted from the base station or to noise and/or interferences. However, a good judgement of the overall noises and/or interferences can be obtained from the determination of received signal strength in the downlink channel of a signature which is known not to be used in a transmission of an AI. If it is determined that the received signal strength in the downlink channel of a second signature not used to transmit an indicator signal is high, e.g. larger than a predetermined threshold, this is a strong indication that the noises and/or interferences are large and that the corresponding access slot can not be relied upon for reception of indicator signals.

Returning to the description of step 40 of the method 10, the determination of the received signal strength in the access slot could alternatively be performed by using a reserved signature allocated to the determination of the received signal strength.

After this step 40, the step 50 of the method 10 would again comprise an assertion, of whether the detection of an AI in the access slot is reliable. Since it is well known that the reserved signature is not used to any substantial signals, the determination of a received signal strength associated with this reserved signature gives an indication of the overall level of noises and/or interferences on the downlink channel. Step 50 could comprise the comparison of the received signal strength, i.e. the strength of noise and/or interferences, with another predefined threshold, where this threshold could correspond to an upper limit of the allowed level of noise and/or interferences. It should be noted, that the use of a reserved signature should typically be set in the technical specification of the communications system.

Returning again to step 40 of the method 10, another alternative is that step 40 of the method 10 is carried out by determining the received signal strength in said downlink channel of at least one randomly chosen signature in the set of unique signatures. Preferably, the received signal strength in said downlink channel of two or more randomly chosen signatures is determined.

Hereafter, the flow continues to step 50 of the method 10, which again comprises an assertion, of whether the detection of an AI in the access slot is reliable. Normally, the level of noises and/or interferences is negligible. Moreover, a large portion of the signatures are not used. Thus, if the received signal strength for all of the at least one, preferably two or more, randomly chosen signatures are high, the determination in step 50 will be, that the influence of noise and/or interferences is too high to obtain a reliable signal in the corresponding access slot.

The flow ends in step 60.

FIG. 2 shows a flowchart of a method 100 that is an alternative embodiment of the method according to the invention. The steps 115 to 140 corresponds to the steps 15 to 40 of FIG. 1 and will therefore not be described further. In connection with the description of FIG. 1, a few alternative embodiments of the steps 40 and 50 were described. Thus, the step 140 of the method 100 corresponds to any of the alternative embodiments of step 40 of the method 10.

Step 150 of the method 100 corresponds to the appropriate embodiment of step 50 of the method 10 (i.e. corresponding to the embodiment of step 40 of the method 10) plus the additional features of waiting for a later access slot and returning to step 140, if the assertion of whether the detection of an AI in an access slot is reliable indicates that the detection is not reliable. The later access slot could be the next access slot or an access slot some time later if no reliable AI yet has been received. If the assertion in step 150 indicates that the detection of an AI in an access slot is reliable, the flow ends in step 160.

An alternative method step 150 (not shown) of the method 100 could be to retransmit the random access request (RAR) to said base station (BS) on the uplink channel, if the determination in step 150 indicates that the detection of an AI in the access slot is not reliable. This corresponds to repeating the steps 120-150 of the method 100.

FIG. 3 shows a flowchart of a method 200 that is another alternative embodiment of the method according to the invention. The steps 215 to 250 corresponds to the steps 115 to 150 of FIG. 2 and will therefore not be described further.

If the assertion in step 250 of the method 200 of whether the detection of an AI in an access slot is reliable indicates that the detection is not reliable, the flow continues to step 255, wherein the AI is received in an extra access slot. If the assertion in step 250 indicates that the detection is reliable, the flow continues to 260, wherein it ends.

It should be noted that in all the methods 10, 100 and 200, a step just prior to the step 60, 160, 260 of ending the flow could be added (not shown). In this added step, an AI from a base station in the access slot that has been proven to be reliable and to interpret this AI as an ACK, NACK or NOM message.

Figure 4:
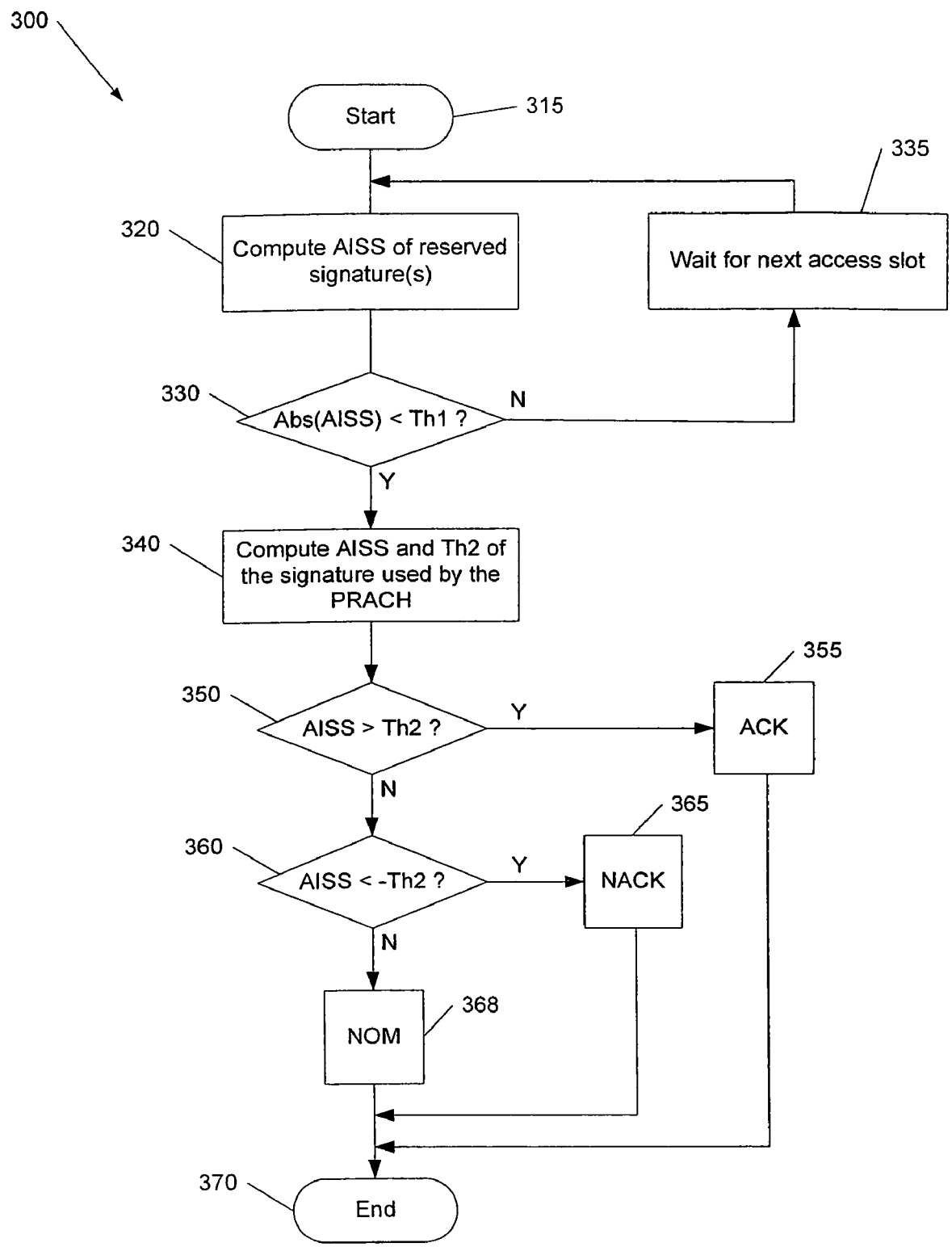
FIG. 4 shows a flowchart of a method of receiving and interpreting an indicator signal.

FIG. 4 shows a flowchart of a method 300 of receiving and interpreting an indicator signal in the form of an AI, wherein the reception of the AI includes asserting whether the access slot in which the indicator signal is received is reliable.

The flow starts in step 315 and continues to step 320, wherein received signal strength on the downlink channel, the so-called received AICH Signal Strength (AISS), of a reserved signature is computed by means of equation (1). As explained in connection with FIGS. 1 to 3, the reserved signature is a signature not used for transmitting random access requests or AI, but only used for detecting the AISS of the signature. Alternatively, the signature could be one or more signatures chosen randomly as explained in connection with FIG. 1. After step 320, the flow continues to step 330, wherein the absolute value of the AISS of the reserved signature is compared to a first threshold value Th1. This first threshold value Th1 can be predefined as a maximum allowed level of noise and/or interferences. If the comparison in step 330 indicates that the absolute value of the AISS is equal to or larger than the first threshold value Th1, the flow continues to step 335, wherein the next access slot is awaited. After step 335 the flow goes back to step 320.

In step 330, if the absolute value of the AISS is smaller than the first threshold value Th1, this is an indication that the noise and/or interferences is/are smaller than the allowed maximum and that the detection of an indicator signal, i.e. an AI, via the downlink channel in question is reliable.

Thus, in case of the absolute value of the AISS being smaller than the first threshold value Th1, the flow continues to step 340. In step 340 the AISS and a second threshold value Th2 of a signature used by the channel PRACH are computed. The AISS is computed by means of equation (1) and the second threshold value Th2 corresponds to the threshold $\Gamma_{FAR}$ calculated by means of equation (2) above. The following steps of the method 300 are related to interpreting an AI sent via the signature used by the PRACH. After step 340, the flow goes to step 350, wherein the AISS is compared with the second threshold Th2.

If step 350 indicates that the AISS is larger than Th2, the flow continues to step 355, wherein it is determined that an AI corresponding to an ACK message was received. Thereafter, the flow ends in step 370. If step 350 indicates that the AISS is not larger than Th2, the flow continues to step 360, wherein the AISS is compared with the negative value of Th2. If the comparison in step 360 indicates that the AISS is smaller than −Th2, the flow continues to step 365, wherein it is determined than an AI corresponding to a NACK message was received. Thereafter, the flow ends in step 370. If the comparison in step 360 indicates that the AISS was not smaller than −Th2, the flow continues to step 368, wherein it is determined than no message (NOM) was received. The flow ends in step 370.

It should be noted, that the probability of large noise and/or interferences on a downlink channel for a given signature is rather low. Therefore, usually the noise detections of the signature in step 320 of the method 300 are only performed for the first access slot. Only when the noise and/or interferences are detected to be larger than the predefined first threshold Th1, the next access slot is monitored. Therefore, in general the access slots involved are the same as the access slots used by the AI detections according to the current AI detections. Since the calculations of AISS and $\Gamma_{FAR}$ for different signatures in the same access slot are calculated using exactly the same combined symbols in the receiver part of the user equipment, the additional resource requirements in the method according to the invention are marginal. In the case of consecutive access slot transmissions, two access slots should be sufficient. Even in the case wherein the noise and/or interferences are found to be too large, i.e. where the access slot is found not to be reliable, the AICH symbols for the signature in use over two access slots could be combined to determine AI more accurately.

Figure 5:
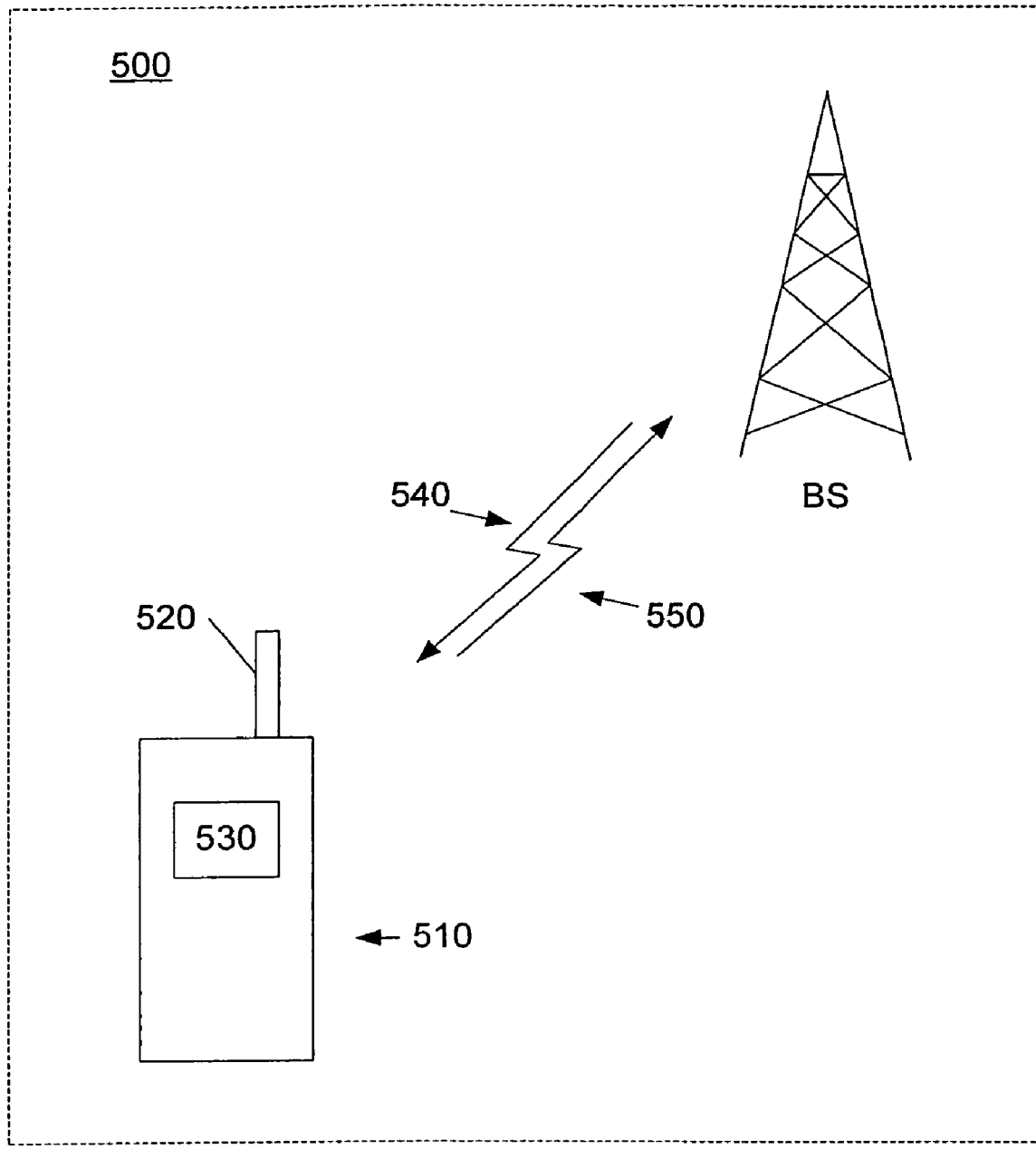
FIG. 5 is a schematic illustration of a base station and a user equipment in a communications system.

FIG. 5 is a schematic illustration of a base station BS and a user equipment 510 in a communications system 500, typically a random access mobile communications system. The user equipment can be a mobile terminal, such as a mobile telephone. Shown are an uplink channel 550 (also called a reverse link) used for communications from the user equipment 510 to the base station BS and a downlink channel 540 (also called a forward link) used for communication from the base station BS to the user equipment 510.

The user equipment 510 has means 520, typically an antenna, for transmitting/receiving signals to/from the base station BS. These means 520 are connected to processor means 530 in the user equipment, the processor means 530 at least being able to determine the received signal strength in an access slot in the downlink channel 540, to assert whether detection of an indicator signal from the base station BS in an access slot in the downlink channel 540 is reliable based on the determination of the received signal strength and to interpret indicator signals received from the base station.

Typically, the processor means 530 of the user equipment is arranged and/or is programmable for performing a variety of functions; however, this lies beyond the scope of this invention and will therefore not be described in further detail. Moreover, the user equipment typically would comprise a plurality of supplemental components, such as microphone, loudspeaker, keyboard, display; again, this lies beyond the scope of this invention and will therefore not be described here in further detail either.

It should be emphasized that the term "comprises/comprising" when used in this specification is taken to specify the presence of stated features, integers, steps or components but does not preclude the presence or addition of one or more other features, integers, steps, components or groups thereof. The mere fact that certain measures are recited in mutually different dependent claims or described in different embodiments does not indicate that a combination of these measures cannot be used to advantage.

The invention claimed is:

1. A method of improving the performance of a random access mobile communications system, comprising the following steps of:
   transmitting, by a user equipment, a random access request to a base station on an uplink channel,
   receiving, by the user equipment, an indicator signal from a base station on a downlink channel which indicator signal has been generated in and transmitted from the base station upon the detection in the base station of said random access request,
   determining a received signal strength in an access slot comprising said indicator signal in said downlink channel; and
   asserting whether detection of said indicator signal in said access slot in said downlink channel is reliable based on the determination step;
   wherein said indicator signal is associated with a first signature selected from a set of unique signatures and wherein the determination step further comprises determining the received signal strength in said downlink channel on at least one second signature in the set of unique signatures, which at least one second signature is different from said first signature.

2. The method of claim 1, wherein said indicator signal is an Acquisition Indicator.

3. The method of claim 1 wherein said at least one second signature is a reserved signature allocated to the determination of the received signal strength.

4. The method of claim 1 wherein said determination of the received signal strength on said at least one second signature is performed in the same access slot as the determination of the received signal strength on said first signature.

5. The method of claim 1 wherein the determination step comprises determining the received signal strength in said downlink channel of at least one randomly chosen signature in the set of unique signatures.

6. The method of claim 1 further comprising the step of, if the asserting step indicates that detection of an indicator signal from the base station in said access slot is not reliable, repeating the determination and asserting steps for a later access slot.

7. The method of claim 1, further comprising the step of: if the asserting step indicates that detection of an indicator signal in said access slot is not reliable, receiving the indicator signal in an extra access slot.

8. The method of claim 1, further comprising the step of: if the asserting step indicates that detection of an indicator signal in said access slot is not reliable, retransmitting said random access request to said base station on said uplink channel.

9. The method of claim 1, further comprising the step of: if the asserting step indicates that detection of an indicator signal from the base station in said access slot is reliable, interpreting said indicator signal from said base station.

10. The method of claim 9, wherein the interpreting of said indicator signal comprises comparing the received signal strength on the downlink channel with at least one predetermined threshold.

11. The method of claim 9, wherein said indicator signal is interpreted as an "acknowledgement message", a "no acknowledgement message" or "no message".

12. A user equipment for use in a random access mobile communications system, comprising:
   means for transmitting a random access request to a base station on an uplink channel;

means for receiving an indicator signal from a base station on a downlink channel;

means for determining a received signal strength in an access slot comprising said indicator signal in said downlink channel; and means for asserting whether detection of said indicator signal in said access slot in said downlink channel is reliable based on said determination of the received signal strength;

wherein said receiving means are arranged to receive an indicator signal associated with a first signature selected from a set of unique signatures; and wherein the receiving means is arranged to determine the received signal strength in said downlink channel on at least one second signature in the set of unique signatures, which at least one second signature is different from said first signature.

13. The user equipment of claim 12, wherein said receiving means is arranged to receive an indicator signal which is an Acquisition Indicator.

14. The user equipment of claim 12 wherein said at least one second signature is a reserved signature allocated to the determination of the received signal strength.

15. The user equipment of claim 12, wherein the receiving means is arranged to determine the received signal strength in said downlink channel of at least one randomly chosen signature in the set of unique signatures.

16. The user equipment of claim 12, wherein the means for interpreting said indicator signal is received from said base station as an "acknowledgement message" (ACK), a "no acknowledgement message" (NACK) or "no message" (NOM).

17. A memory of a user equipment encoded with a computer program product comprising computer executable instructions to be executed by a processor in said user equipment, for performing the steps of:

transmitting, by a user equipment, a random access request to a base station on an uplink channel, receiving, by the user equipment, an indicator signal from a base station on a downlink channel which indicator signal has been generated in and transmitted from the base station upon the detection in the base station of said random access request;

determining a received signal strength in an access slot comprising said indicator signal in said downlink channel; and asserting whether detection of said indicator signal in said access slot in said downlink channel is reliable based on the determination step;

wherein said indicator signal is associated with a first signature selected from a set of unique signatures and wherein the determination step further comprises determining the received signal strength in said downlink channel on at least one second signature in the set of unique signatures, which at least one second signature is different from said first signature.

* * * * *

UNITED STATES PATENT AND TRADEMARK OFFICE
CERTIFICATE OF CORRECTION

PATENT NO. : 7,852,824 B2
APPLICATION NO. : 11/913118
DATED : December 14, 2010
INVENTOR(S) : Wang et al.

Page 1 of 1

It is certified that error appears in the above-identified patent and that said Letters Patent is hereby corrected as shown below:

In Column 6, Line 35, delete " $\{\alpha^*_{s,j}\}$ " and insert -- $\{a^*_{s,j}\}$ --, therefor.

In Column 10, Line 38, in Claim 6, delete "step of," and insert -- step of: --, therefor.

Signed and Sealed this
Eighteenth Day of October, 2011

David J. Kappos
*Director of the United States Patent and Trademark Office*